(12) United States Patent
Lung et al.

(10) Patent No.: US 6,785,616 B2
(45) Date of Patent: Aug. 31, 2004

(54) METHOD OF DETERMINING IF DETERIORATION IN STRUCTURAL INTEGRITY OF A PRESSURE VESSEL, A PRESSURE VESSEL, AND A STRUCTURAL INTEGRITY TESTING APPARATUS THEREFOR

(75) Inventors: Brian Lung, Saskatoon (CA); Joe Y. Wong, Surrey (CA)

(73) Assignee: Saskatchewan Research Council, Saskatoon (CA)

( * ) Notice: Subject to any disclaimer, the term of this patent is extended or adjusted under 35 U.S.C. 154(b) by 0 days.

(21) Appl. No.: 10/460,366

(22) Filed: Jun. 13, 2003

(65) Prior Publication Data

US 2004/0010382 A1 Jan. 15, 2004

(30) Foreign Application Priority Data

Jul. 15, 2002 (CA) ............................................. 2393522

(51) Int. Cl.⁷ ............................................. G06F 19/00
(52) U.S. Cl. ............................ 702/34; 702/35; 702/47; 702/138
(58) Field of Search ............................ 702/34, 35, 36, 702/41, 47, 56, 74, 75, 115, 116, 138; 73/769, 789

(56) References Cited

U.S. PATENT DOCUMENTS

| | | |
|---|---|---|
| 2,439,131 A | 4/1948 | Firestone |
| 3,490,270 A | 1/1970 | Kleesattel |
| 3,592,050 A | 7/1971 | Nutt, Jr. et al. |
| 3,604,249 A | 9/1971 | Wilson |
| 3,815,407 A | 6/1974 | Lavery |
| 4,062,227 A | 12/1977 | Heyman |
| 4,399,701 A | 8/1983 | Dunlop |
| 4,480,480 A | * 11/1984 | Scott et al. ................... 73/769 |
| 4,527,600 A | 7/1985 | Fisher et al. |
| 4,604,896 A | 8/1986 | Taschner et al. |
| 4,911,192 A | 3/1990 | Hartfiel et al. |
| 5,157,610 A | 10/1992 | Asano et al. |
| 5,259,424 A | 11/1993 | Miller et al. |
| 5,476,009 A | 12/1995 | Dimarogonas |
| 5,522,428 A | 6/1996 | Duvall |
| 5,571,966 A | 11/1996 | Tsuboi |
| 6,073,081 A | 6/2000 | Hettinger et al. |

* cited by examiner

Primary Examiner—Bryan Bui
(74) Attorney, Agent, or Firm—Cowling Lafleur Henderson LLP; D. Doak Horne

(57) ABSTRACT

A method for determining if deterioration in structural integrity of a pressure vessel, having both sensor and oscillator affixed to or embedded in said exterior surface thereof. An electrical current is provided to the oscillator so as to cause said oscillator to oscillate and produce a mechanical disturbance to the exterior surface and cause a detectable natural frequency response of said pressure vessel. The resultant natural frequency response is detected and recorded. After a period of elapsed time, the natural frequency response is again obtained. It is compared with the recorded natural frequency response first obtained, and if there be a difference therebetween, such as a shift in the frequencies at which the natural resonances occur, or a decrease or increase in the amplitude of one or more of the natural frequency resonances, then a flag is raised. An apparatus for determining if deterioration in structural integrity of a pressure vessel, and a pressure vessel, is further disclosed.

26 Claims, 8 Drawing Sheets

US 6,785,616 B2

METHOD OF DETERMINING IF DETERIORATION IN STRUCTURAL INTEGRITY OF A PRESSURE VESSEL, A PRESSURE VESSEL, AND A STRUCTURAL INTEGRITY TESTING APPARATUS THEREFOR

FIELD OF INVENTION

The present invention relates to pressure vessels, and more particularly to pressure vessels having oscillator and sensor means, and to a method and apparatus for determining if there may be deterioration in the structural integrity of such pressure vessel.

BACKGROUND OF THE INVENTION

Due to the need of alternative fuelled vehicles, such as natural gas, propane, and potentially fuel-cell powered vehicles, to carry highly pressurized gaseous, or dual-phase (gaseous and liquid) fuels, pressure vessels containing such highly pressurized fuels for such vehicles must be structurally sound and be able to withstand such high pressures.

Up to the early 1990's, pressurized fuel tanks for alternative or dual fuel (propane or natural gas) vehicles were typically cylindrical steel tanks, located in the trunk or in the traditional gasoline tank location for such vehicle. In order to save weight, such tanks were typically of a limited thickness, and thus could only be pressurized to a pressure in the range of 3000–3600 psi (20.68–24.82 MPa), and to conserve weight, they were of a limited size. The range of travel of the vehicle on a single tank fill was accordingly very limited due to not being able to carry more gaseous fuel, resulting in limited range of such vehicles on a single tank fill.

A need arose to have such pressure tanks able to withstand greater pressures, without greatly increasing the weight of such tank, so as to be able to carry more fuel without greatly increasing the tank size (and thus weight). This need has become more acute with the likely and coming introduction of fuel cell vehicles, which require substantial quantities of hydrogen which can only be stored in a gaseous pressurized form. Due to the lesser energy density of hydrogen as compared with natural gas and gasoline, even greater quantities are needed to power a vehicle for the same distance, and thus tanks able to withstand even greater pressures (so as to certain even greater quantities) of such gas are required.

Companies such as Dynetek, Inc. of Calgary, Alberta have developed specialized carbon-fiber composite pressure vessels, which are specially adapted for containing gaseous fuels at high pressure, in the range of 3000–10,000 psi (20.68–68.95 MPa). These specialized tanks typically consist of a substantially cylindrical inner vessel, typically of aluminum or a plastic. To the exterior surface of such inner vessel is wound a plurality of carbon fiber strands embedded in a polymer composite (CFRP), which is cured to form an exterior, extremely lightweight shell (known as a CFRP shell), highly resistant to tensile and hoop stresses to which it is subjected to by the compressed gases within the inner vessel. The exterior CFRP shell, which is typically comprised of a series of strands of carbon fiber which are wound about the exterior surface of the inner pressure vessel and held together with a polymer resin, effectively bears the bulk of the hoop stresses exerted by the highly pressurized gases which are injected into the inner pressure vessel.

These CFRP pressure vessel fuel storage tanks are adapted for storing propane, methane and/or natural gas, but are particularly adapted for storing hydrogen for fuel cell vehicles.

These CFRP pressure vessels, like all other pressure vessels, can become weakened through fatigue due to cyclic stresses which arise due to the high pressures involved and the continual filling, exhausting, and re-filling such tanks. In addition, the structural integrity of such CRFP pressure vessels may be compromised as a result of structural damage to the exterior CFRP shell due to cuts, gouges, or deformation thereto arising in the handling, storage, or filling of such pressure vessel. Alternatively, such pressure vessels can become damaged through overpressure, if for example, the pressure relief valve which is typically installed on such tanks was to fail or become inoperative.

Importantly, due to the extremely flammable nature of stored gaseous fuels such as natural gas and hydrogen, and due to the extremely high pressures under which such gas is stored, it becomes of paramount importance that such pressure vessels be structurally sound. Otherwise, due to the intended application of such tanks for use in motor vehicles or bulk transportation of gases on public highways, structural damage of such tanks can result in catastrophic failure of such tanks, and ignition of the flammable contents upon release of such contents to the atmosphere, with likely resultant loss of human life as well as material and property damage. Accordingly, it is of paramount importance that damaged or structurally compromised tanks be immediately removed from service.

Unfortunately, it is not easy, and in most cases impossible to determine if the structural integrity of a CFRP pressure vessel has been compromised from a simple visual inspection of such pressure vessel.

Accordingly, a real and clear need exists for a method to determine if the structural integrity of a modern CFRP pressure vessels has been possibly compromised.

A further need exists for a pressure vessel which is able to self-monitor and warn when structural integrity thereof may have been compromised.

Lastly, a further need exists for an apparatus to be able to determine if the structural integrity of a pressure vessel has been compromised.

Fulfillment of these needs allows an important advance in the implementation of CFRP pressure vessels, and allows structurally-compromised pressure vessels to be withdrawn from use and thereby reduce i) the possibility of leakage from such pressure vessels and the consequent loss of such fuel, or, worse yet ii) catastrophic failure resulting in explosion due to the extremely high pressures to which the vessel is subject to.

U.S. Pat. No. 5,522,428 teaches a composite pressure vessel 20, having a three types of sensors, namely a pair of strain sensors 46, a pair of temperature sensors 48, and a pair of acoustical sensors 44, all of which are applied to the exterior of the load-bearing composite shell 28 of the composite vessel (ref. col. 3, lines5–12). All sensors are connected to a microprocessor (CPU) 32, which is in turn connected to a solenoid valve 26, which controls flow of gas to/from the vessel. The strain sensors 46 permit the microprocessor to count the number of fill cycles to which the vessel is subject, to keep track of when the cyclic stresses on the vessel may be reaching the design limit thereof. The temperature sensors 48 allow over-temperature conditions (and thus possible structural degradation to the vessel) to be sensed. The acoustic emission sensors 44 count the sound emissions in a given time period above a trigger level intensity, which if above a certain level, may indicate imminent failure. If any of certain conditions are sensed, the microprocessor 32 may cause the solenoid 26 to prevent refill of the pressure vessel 20.

The aforesaid method disclosed in US '428 for monitoring pressure vessel integrity involves numerous types of different types of sensors, and as such does not provide a single sensor capable of determining in and by itself the tank integrity.

Moreover, acoustical sensors are relatively large in size, and are relatively expensive. Furthermore, in motor vehicle (ie. "noisy") environments, acoustic sensors may be unreliable. Lastly, there is no teaching in such patent as to how the "count" of pressure cycles is to be maintained by the microprocessor in the event of interruption of electrical power to the microprocessor. Indeed, it seems clear from this patent that electrical power must continue to be supplied to the microprocessor (col. 5, line 15–16—"with current battery technology, it is likely that the CPU 32 can be maintained by an integral battery").

Accordingly, a real need continues to exist for a lower cost method and apparatus for being able to determine pressure vessel structural integrity.

SUMMARY OF THE INVENTION

The present invention makes use of the concept that a structural change in a component (which may indicate a deterioration in the structural properties of the component) results in a change in the value of the various natural frequency resonances of such component, and more particularly, results a shift in the frequencies at which the natural resonances occur and/or a decrease or increase in the amplitude and shapes one or more of the natural frequency resonances.

Accordingly, changes in the value, amplitude, and/or shape of the natural frequency response of a component when new, as compared to the value, amplitude, and/or shape of the natural frequency response at a later time At after such component has, for example, been subject to a number of stress cycles, may possibly indicate a change in the physical properties, including a reduction in the structural integrity of such component.

Accordingly, the present invention, in one of its broad embodiments, provides a method for determining if there may be deterioration in structural integrity of a pressure vessel having an exterior surface, where both sensor means and oscillating means are affixed to or embedded in such exterior surface. Such method comprises the steps of:

(a) providing an electrical current to said oscillator means so as to cause said oscillator means to oscillate so as to produce a mechanical disturbance to said exterior surface and cause a detectable natural frequency response of said pressure vessel;

(b) detecting, using said sensor means, said natural frequency response;

(c) recording said natural frequency response;

(d) after a period of elapsed time, repeating steps a) and b) above; and (e) comparing said recorded natural frequency response first obtained with said resultant natural frequency response last obtained, and determining if there be a difference therebetween.

Notably, depending on the type of composite shell used for the pressure vessel, the natural frequency profile of the pressure vessel may not substantially change as a result of minor changes in temperature and/or pressure to which the pressure vessel, and in particular the composite load-bearing shell thereof, may be subjected to. Accordingly, the method of the present invention is particularly suited to CFRP pressure vessels having an inner vessel and a composite (load-bearing) exterior shell, since the natural resonant response of such load-bearing CFRP shell is not particularly affected by changes in temperature and/or pressure, However, in instances where the natural frequency profile of the pressure vessel is sensitive to changes in pressure and/or temperature to which the vessel is subject, or alternatively, in instances where the natural frequency profile last obtained is sensed at a temperature and/or pressure substantially different than what the pressure vessel was subject to initially so that the natural frequency response last obtained differs with that first obtained due to these changes in temperature and/or pressure, the method of the invention includes various refinements.

In a first refinement, wherein said mechanical disturbance in step a) occurs when said pressure vessel is subject to no internal pressure or a selected internal pressure, said steps a) and b) are repeated as per step d) at a time when said pressure vessel is subjected to said same no pressure or said selected pressure in order to be able to properly compare the natural frequency profile last obtained with the natural frequency profile first obtained.

In an alternative (or additional) refinement, wherein said mechanical disturbance in step a) occurs when said pressure vessel is subject to a particular temperature, said steps a) and b) are repeated as per step d) at a time when said pressure vessel is subjected to said same particular temperature.

Finally, in a further embodiment of the invention where the natural frequency response of the pressure vessel is sensitive to changes in pressure and/or temperature, or where it is desired to obtain the last-obtained natural frequency response at a time when the temperature and/or pressure to which the pressure vessel is subject is substantially different than when the natural frequency response was first obtained, the method of the present invention contemplates applying a correction to the natural frequency profile last obtained to compensate for such change in temperature and/or pressure, in order to be able to properly compare such response with the natural frequency response first obtained.

Accordingly, in a method of the present invention where mechanical disturbance in step a) occurs when said pressure vessel is subject to a particular pressure and/or temperature, and step a) and b) are repeated as per step d) when said pressure vessel is subjected to a different pressure and/or temperature, then in a further embodiment of the present method such method comprises, prior to step e), applying a correction to adjust said last-obtained natural frequency response for said different pressure and/or temperature, so as to be able to compare said frequency response first obtained with said frequency response last obtained.

The sensor means, in a preferred embodiment of the present invention, comprises a piezo-electric material affixed to the surface of the pressure vessel, or embedded in the fiber-reinforced shell of such CFRP pressure vessel. Sensors of this type have been found to be suitable when so placed to detect natural frequency responses of such pressure vessel.

Similarly, oscillation means in the form of a piezo-electric material affixed to the surface of the pressure vessel, or embedded in the fiber-reinforced polymer shell of such pressure vessel so as to protect such piezo-electric material from exposure to the elements and/or damage, has been found to be suitable when so placed for generating a mechanical disturbance in such polymer shell sufficient to generate a detectable natural frequency response of such pressure vessel.

In a further embodiment of the method of the present invention, said step of comparing the natural frequency response first obtained with the resultant natural frequency response last obtained comprises obtaining a voltage response from the sensor means as a function of time, and comparing said voltage response with a later obtained voltage response as a function of time, and determining if there be any differences, including such differences as to any shift in the value of the natural frequencies of such component, the amplitude of the natural frequencies, and/or the shape and/or amplitude of the natural frequency response of such component. In yet a futher refinement of the method as set out above, the step of comparing said resultant natural frequency response first obtained with said natural frequency response last obtained comprises:

i) calculating a power spectrum density as a function of frequency from said resultant natural frequency response of said piezo-electric sensor means first obtained, and ii) calculating a power spectrum density as a function of frequency from said natural frequency response of said piezo-electric sensor means last obtained; and iii) comparing said power spectrum density obtained from step ii) above with that obtained from step i) above, and determining if there are differences.

In another aspect of the present invention the invention includes a structural integrity testing apparatus for a pressure vessel having an exterior surface comprised of a composite material having both sensor means and oscillator means affixed to or embedded in said exterior surface; comprising:

means for applying an electrical currrent to said oscillator means so as to cause said oscillator means to oscillate so as to produce a mechanical disturbance to said exterior surface and cause a detectable natural frequency response of said pressure vessel;

means for recording said natural frequency response of said pressure vessel; and means for comparing said recorded resultant natural frequency response with a later-obtained natural frequency response, and determining if there be any difference therebetween.

In a further refinement of the test apparatus of the present invention, such apparatus further comprises means for indicating lack of pressure vessel integrity to an operator if said means for comparing indicates differences were detected.

In yet a further refinement of the test apparatus of the present invention, such apparatus further comprises means for applying a correction to said later-obtained natural frequency response to adjust for any differences in temperature and/or pressure to which said pressure vessel may be then subject as compared to temperature and/or pressures which it was subject at the time of first recording said resultant natural frequency response.

In a still further aspect of the present invention, the present invention relates to a pressure vessel. Such pressure vessel comprises:

an inner vessel;

a composite material surrounding said inner vessel and forming an exterior surface;

both sensor means and oscillator means affixed to or embedded in said exterior surface; and, means for storing a natural frequency response as received from said sensor means, after a mechanical disturbance has been provided to said exterior surface of said pressure vessel by said oscillator means.

BRIEF DESCRIPTION OF THE DRAWINGS

Reference is to be had to the accompanying non-limiting drawings depicting non-limiting particular embodiments of the invention, wherein.

DETAILED DESCRIPTION OF THE PREFERRED EMBODIMENTS

Figure 2:
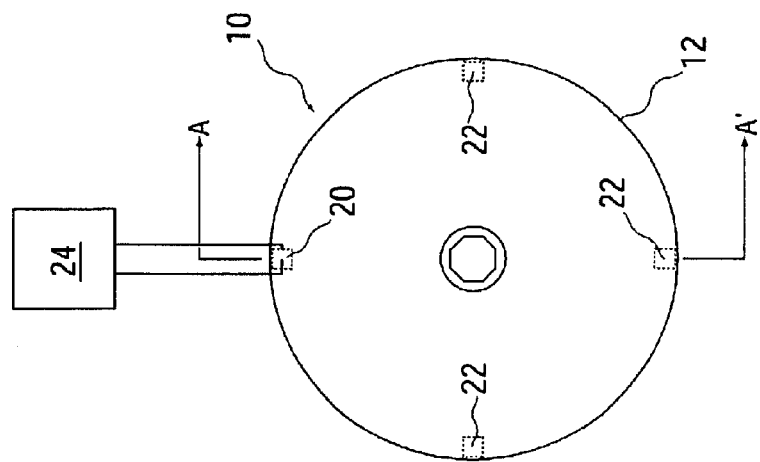
FIG. 2 is a front view of the pressure vessel shown in FIG. 1.
Figure 1:
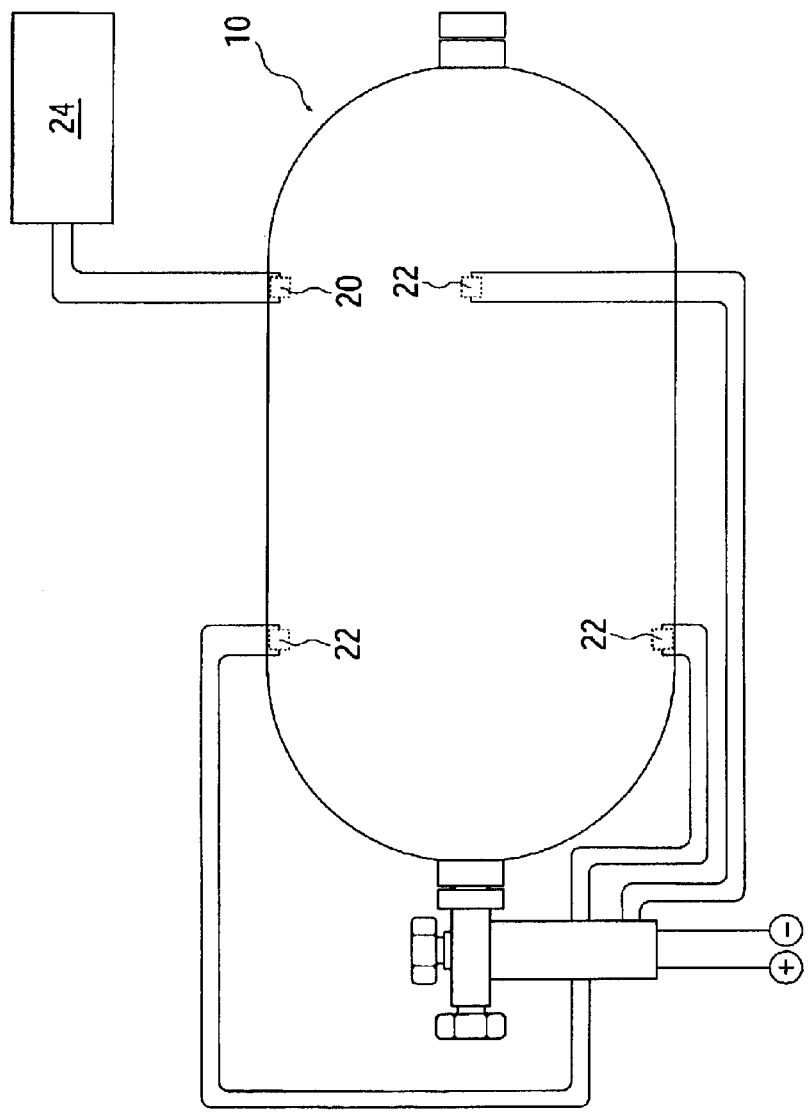
FIG. 1 is a side elevation view of a pressure vessel of the present invention, having sensors embedded in the exterior shell of said pressure vessel.
Figure 3:
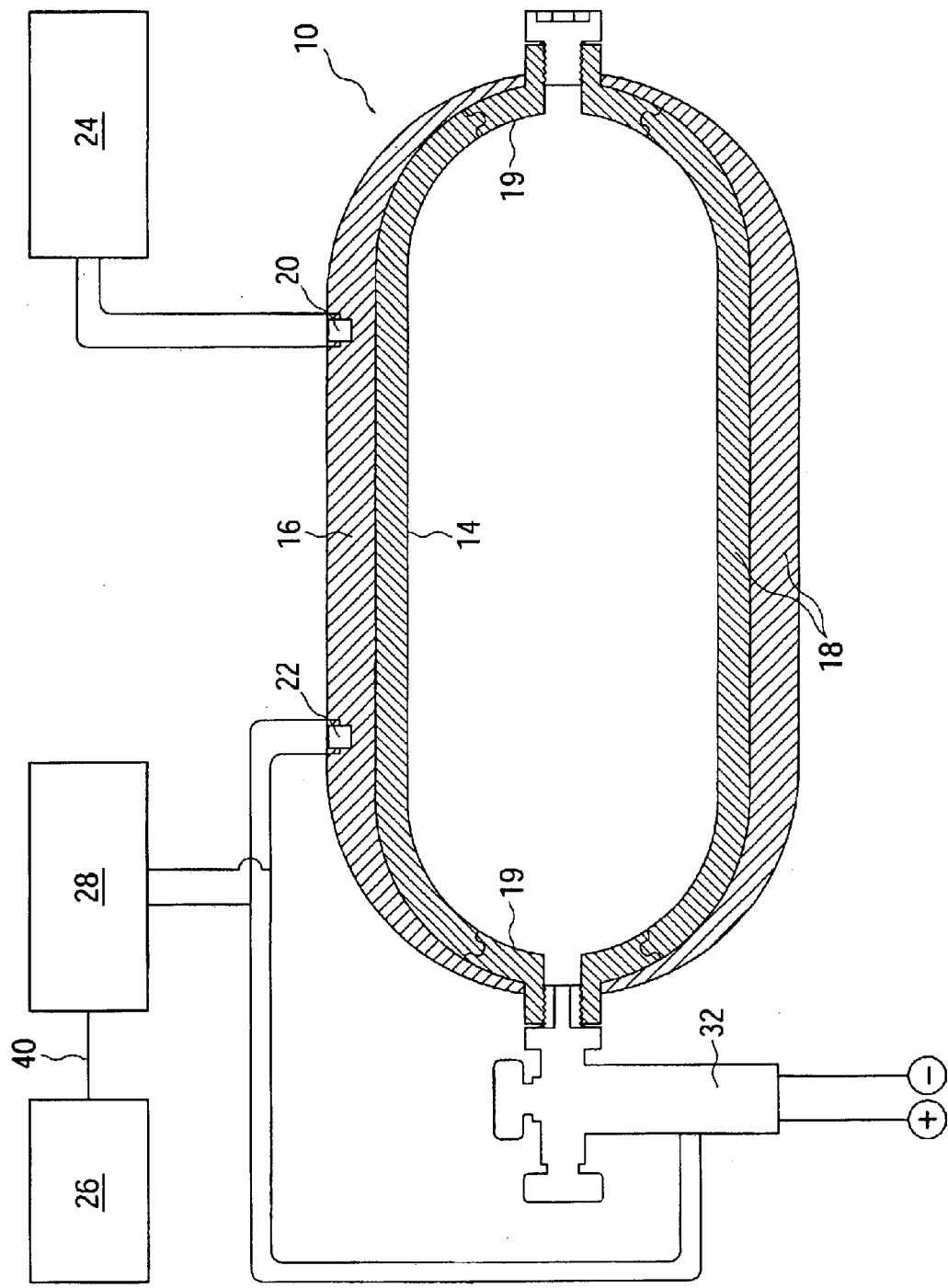
FIG. 3 is a combined schematic of structural integrity testing apparatus of the present invention, and a cross-sectional view through the pressure vessel shown in FIG. 2 taken along plane A—A of FIG. 2.

FIGS. 1, 2, & 3 show apparatus 10 for determining whether the structural integrity of a pressure vessel 12 may have been compromised.

Pressure vessel 12, in a preferred embodiment, shown in side elevation, frontal view, and cross-sectional view in FIGS. 1,2,& 3 respectively, consists of an inner vessel 14 typically of a plastic material or a lightweight metal or metal alloy, which is surrounded by a composite shell 16. At least one aperture, typically in the form of a metallic hollow threaded boss 19, is present at one end of vessel 12 to allow filling of such vessel 12.

Composite shell 16 is preferably comprised of a carbon fiber reinforced polymer (CFRP) composite material, having a series of wound carbon fibers embedded in a polymer resin-like material, which thereby forms a lightweight, load-bearing exterior shell 16 for said inner vessel 14. Other materials for such shell 16 may be used. It is not necessary that such pressure vessel 12 consist of both an exterior shell 16 and an inner vessel 14, and may instead be comprised of a single vessel.

Apparatus 10 comprises, as shown in FIGS. 1,2 & 3, an oscillator 20 embedded in, or affixed to, the wall 18 of pressure vessel 12. In a preferred embodiment there may be more than one oscillator 20. Such one or more oscillators 20 are adapted, when desired as more fully explained later, to provide a discrete mechanical disturbance to the wall of the pressure vessel 12, and in a preferred embodiment where said pressure vessel 12 comprises an inner vessel 14 and a composite load-bearing shell 16, are adapted to provide a discrete mechanical disturbance to said composite load-bearing shell 16.

In a preferred embodiment, oscillator 20 comprises a piezo-electric material which, when supplied with an electric current, resonates at one or more frequencies to provide such mechanical disturbance. One such piezo-electric oscillator that has been found suitable for these purposes is sensor DT1-028K/L series, p/n 1-1002608 supplied by MSI Measurement Specialties Inc., having an overall length of 41 mm, a width of 16 mm, and an overall thickness of 40 microns. When used as a high frequency transmitter (generally >500 kHz), maximum transmission (ie oscillation) occurs at the piezo-electric-film thickness resonance, which for a piezo-electric-film of 28 microns is about 40 MHz.

Such apparatus 10 of the present invention further comprises one, and preferably a plurality of, sensors 22, likewise embedded in, or affixed to, wall 18 of pressure vessel 12, as shown in FIGS. 1, 2, & 3. Such sensors 22 are adapted to be responsive to natural frequency waves which may propagate through wall 18 of pressure vessel 12 upon wall 18 being provided by oscillator 20 with a discrete mechanical disturbance. Such sensors 18 are adapted to provide a voltage output over time, from which a characteristic natural frequency response of such pressure vessel 12, at a given point in the life of the pressure vessel (and thus number of fill cycles), may be obtained. In a preferred embodiment, such sensors are piezo-electric-film, which is adhesively secured to the exterior shell 16 of the pressure vessel 12, or embedded therein.

Piezo-electric-film which has been found suitable for use as sensors 22 in the apparatus 10 of the present invention is the same piezo-electric-film which may be used as the oscillator 20, namely 40 micron thickness piezo-electric-film, in the form of sensor DT-o28K/L series, p/n 1-1002608-0 supplied by Measurement Specialties Inc., having a capacitance of approximately 1.38 nF, and sensitive over the 17 MHz to 80 MHz frequency range.

Means 24 for providing an electrical current to oscillator 20 so as to cause said oscillator to oscillate is further included in the apparatus 10 of the present invention. In a preferred invention, for oscillator 20 having the specifications as set out above, a Hewlett Packard model 8012B pulse generator, has been found suitable for this purpose for supplying an alternating current to the oscillator 20, in the form of a timed electrical impulse of approximately 12 volts in amplitude with a rise in time of 8 nanoseconds and a duration of 3 microseconds.

Apparatus 10 of the present invention for verifying structural integrity further comprises means 26 for recording an initial resultant natural frequency response of the pressure vessel 12 as received by the sensors 22. In a preferred embodiment, such means 26 comprises a personal computer having an analogue-to-digital card, such as a Gage Compuscope 8500 analogue-to-digital card to convert the analogue output received from sensor 22 into digital format which is fed to such personal computer using a traditional serial port 40. Other means, instead of a personal computer, could be utilized, such as a ROM computer chip, for digitally recording the resulting natural frequency response.

It is generally desirable that means 26 for recording such natural frequency response, in order to select the appropriate magnification to obtain a discernable natural frequency response, and particularly where more than one sensor 22 is used, further comprise an oscilloscope 28, wherein the natural frequency response for pressure vessel 12 as received from one or more sensors 22 is individually recorded on corresponding sensor channel of said oscilloscope 28, and thereafter or simultaneously, via a IEEE interface 40, fed to a personal computer and recorded electronically, either on the PC hard drive, floppy disc, or some other electronic storage medium, as shown in FIG. 3.

The means 26 for recording, which in one embodiment is a personal computer, further comprises means for detecting a voltage response from the one or more sensors 22, and recording said voltage response from the one or more sensors 22 as a function of time. Typically the output from sensors 22, when piezo-electric-film of the type specified herein is used, is in the form of a millivolt output, which is received by an analogue-to-digital card, and is then easily recorded by the recording means 26, as it varies over time, on any of the mediums described earlier herein.

In a further embodiment of the invention, it has been found that other modes of storing and comparing (see below) the natural frequency response of the pressure vessel 12 may be used. For example, in a further preferred embodiment, the means 26 for recording the natural frequency response of the pressure vessel further comprises means for calculating a power spectrum density (ie a frequency spectrum) from an output signal received from the sensors 22. This transformation of the output data data from the sensors 22 can easily be done by modern oscilloscopes, and is another reason for the oscilloscope 28 being used to receive the output from sensors 22 prior to such output being provided to the personal computer 26 for comparison (see below).

Test apparatus 10 of the present invention further comprises means 28 for comparing the recorded resultant natural frequency response of the pressure vessel 12 with the natural frequency response of such pressure vessel 12 at a time t=A, and determining if there be any differences therebetween. In a preferred embodiment such means for comparison comprises a personal computer 26.

Differences arising from such comparison may take the form of one or more shifts in the value of the frequencies at which the natural resonances of the pressure value 12 occur, and/or a decrease or increase in the amplitude and shapes of the natural frequency resonances.

Accordingly, in a preferred embodiment, said means for comparing the recorded resultant natural frequency response of the pressure vessel 12 first obtained with the natural frequency response of such pressure vessel 12 obtained at time t=Δ comprises the same personal computer which forms part of such data recording means 26, and which is further programmed to compare the digital data. Alternatively, such means for comparing may comprise microprocessor means (not shown), operatively connected to such recording means 26, and programmed to compare the natural frequency response first obtained and recorded on a ROM chip therein, (which comprises said recording means 26) with a subsequent natural frequency response later obtained from sensors 22.

Digital data is generally recorded as a plurality of ordered pairs of binary numbers. Numerous means of comparing pluralities of ordered pairs of binary numbers are known, and will occur to persons skilled in the art. In a preferred embodiment, the comparison between such two natural frequency responses will yield a correlation co-efficient (with a co-efficient of 1.0 indicating a perfect correlation.) Such comparison program, or microprocessor, may further be programmed to "flag" any correlations where the correlation co-efficient between the natural frequency response first obtained and that subsequently obtained is less than some fraction of 1.0, say 0.9, as indicating potential possible compromise to the structural integrity of pressure vessel 12.

It is sometimes the case, for continuous monitoring of the natural frequency of a pressure vessel, that the later-obtained natural frequency response will be taken when the pressure vessel 12 is at a different temperature and or pressure than when the natural frequency response was first obtained. For some pressure vessels 12, depending on the construction thereof, the natural frequency response will be sensitive and fluctuate depending on the pressure and/or temperature to which the pressure vessel 12 was exposed when such natural frequency profile was obtained. This is clearly undesirable, as such will incorrectly cause a pressure vessel 12 to be "flagged" as possibly being structurally compromised when in fact the only reason for the difference or differences in the frequency response of the pressure vessel 12 arose from the differences in temperature and pressure to which vessel 12 was subjected to.

Accordingly, in a further refinement of the apparatus 10 of the present invention, means 30 (not shown) is further provided for applying a correction to any later-obtained natural frequency response, to thereby adjust for any differences which arise in such natural frequency response due to different temperature and/or pressure, thereby causing changes in the modulus of elasticity of the composite materials, to which the pressure vessel 12 is exposed at the time of obtaining the last-obtained natural frequency response. For example, where differences in the form of a change in the value of the various natural frequency resonances occur results from a known change in temperature to which pressure vessel 12 may be exposed, then a correction factor may be applied to "shift" the value of the natural frequency resonances back to the value which they had at the temperature at which the first-obtained natural frequency response was obtained. This correction factor may be experimentally obtained and a value to be applied selected from a resulting "look up" table. Alternatively, a correction factor may be theoretically calculated as a function of the temperature differential, and thereby applied.

In the preferred embodiment means 30 for providing a correction comprises a personal computer, namely the same computing means which is used as a recording means 26 and comparison means, which applies the correction to the natural frequency response, either to correct the last obtained frequency response to compare it with the first obtained natural frequency response, or to correct the first obtained frequency response to compare it with the frequency response last obtained at the temperature and pressure therefore.

In another aspect of the present invention, with reference in particular to FIGS. 1, 2, & 3, such invention comprises a pressure vessel 12, comprising an inner vessel 14, a reinforced material surrounding inner vessel 14 and forming an exterior surface or shell 16, one or more sensors 22 and an oscillator 20, each affixed to or embedded in the exterior shell 16, and a means 26 for storing a resultant natural frequency response as received from sensors 22, after a mechanical disturbance has been provided to the shell 16 by the oscillator 20.

Typically, the pressure vessel is provided with an electrically operated solenoid valve 32 (see FIG. 3), which when operatively connected to a vehicle (not shown), allows flow of the contents of the pressure vessel 12 upon, for instance, the turning of the ignition key of such vehicle. In a preferred embodiment of the pressure vessel 12 of the present invention, the means 26 for storing a resultant natural frequency response when the pressure vessel is initially in a structurally sound state is contained within or coupled to such solenoid 32, or embedded in the exterior shell 16 of vessel 12. In such preferred embodiment, means 26 for recording such natural frequency response is in the form of a ROM computer chip having a non-volatile memory, which can then permit continuous comparison with later-obtained natural frequency responses obtained, for example, by test apparatus of the within invention which may be located on-board a vehicle. In such fashion, the original natural frequency response of such pressure vessel 12, along with any temperature and pressure data taken at the time of recording such natural frequency response, will accompany such pressure vessel wherever it may go, thus allowing the method of the invention (see below) to be practised by any test apparatus of the present invention.

Figure 4:
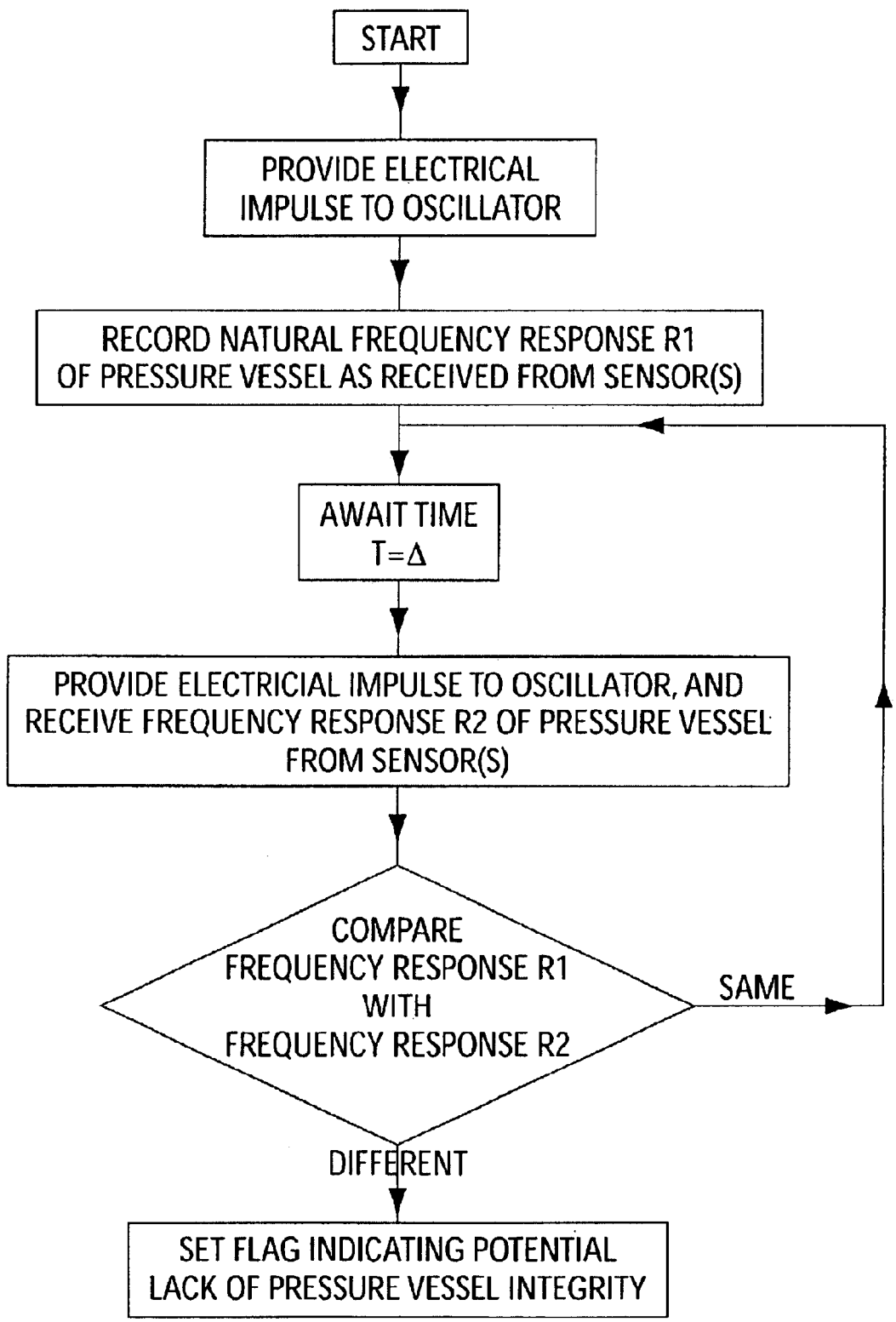
FIG. 4 is a flow diagram of an embodiment of the method of the present invention for determining if the structural integrity of a pressure vessel has been compromised.
Figure 5:
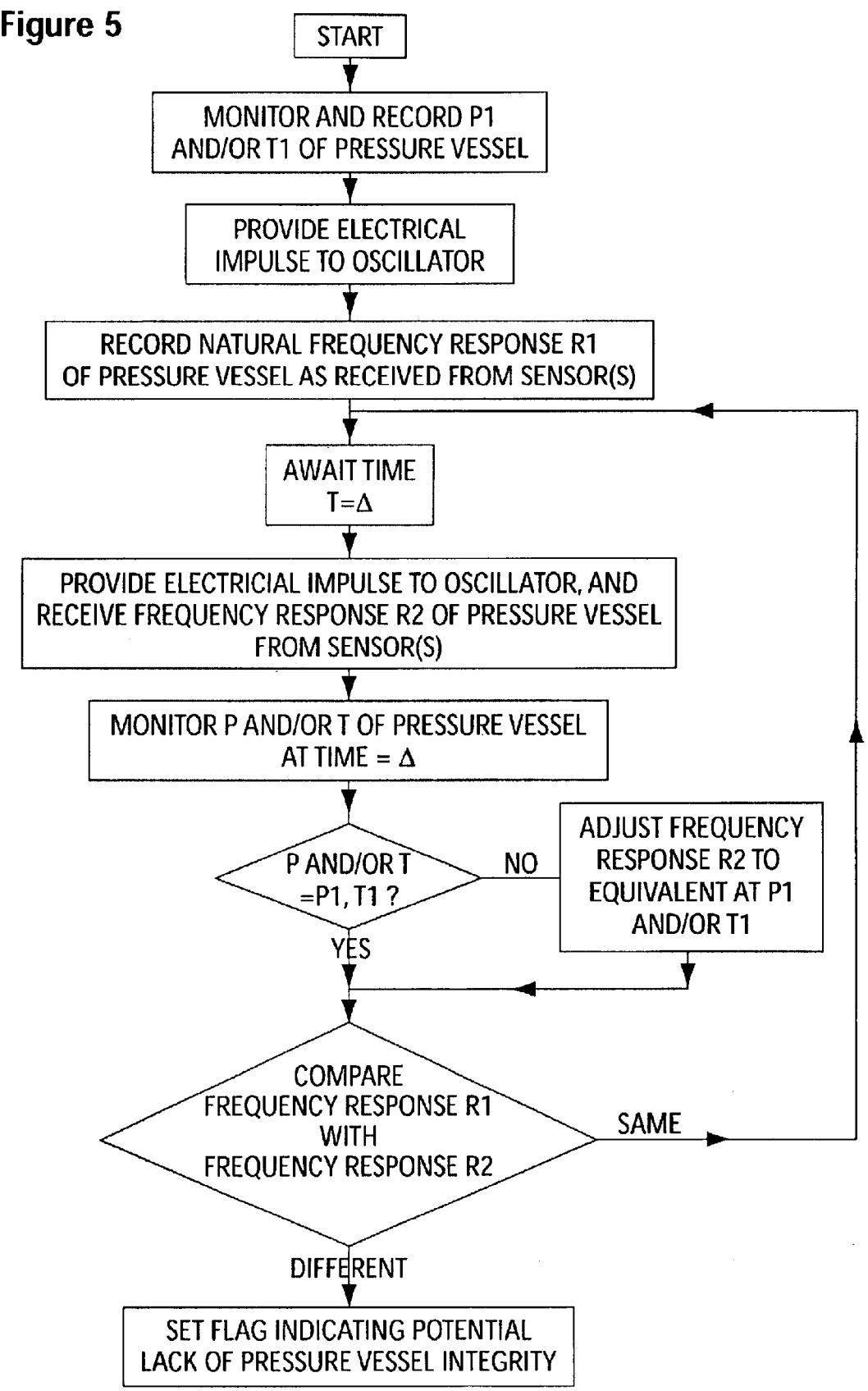
FIG. 5 is a flow diagram showing a further refinement of the method set out in FIG. 4.

A pressure vessel 12 having permanently associated therewith the original natural frequency response is particularly suited to permit the practice of the method of the present invention, certain embodiments of the method of the present invention being shown in FIGS. 4 & 5.

EXAMPLE 1

A 33 liter CFRP pressure vessel, of dimensions 273 mm×795 mm, of the L33 series, manufactured by Dyneteck Industries Ltd., had a series of sensors 22 of the type DT1-028K/L Series, p/n 1-1002608-0, which were embedded in the exterior shell 16 of such pressure vessel 12, at the locations shown in FIGS. 1,2,& 3 herein, namely every quarter (90 degrees) on alternate ends of such vessel 12 just underneath the final carbon fiber hoop wrap of shell 16 applied to such vessel 12. Such sensors 22 were each embedded approximately 6 mm beneath the exterior surface of shell 16 during construction of such pressure vessel 12.

One of such sensors 22 was further used as an oscillator, in that it was provided with an electrical impulse voltage from a Hewlett Packard 8012B pulse generator, 12 volts in amplitude with a rise time of 8 nanoseconds and a duration of 3 microseconds.

Output signals from each of the various sensors 22 (more than one sensor was used for data checking and consistency monitoring) were monitored on corresponding channels on a Tektonix TDS 544A oscilloscope, an appropriate scale of $5 \times 10^{-5}$ was used, and an output was sent, via an IEEE 488 data interface card (National Instruments) in a personal computer. A representative sample having an averaged output from each of the output obtained from the sensors 22 as a function of time was stored on the computer hard drive. Such representative sample is attached as FIG. 6A hereto.

Figure 7A:
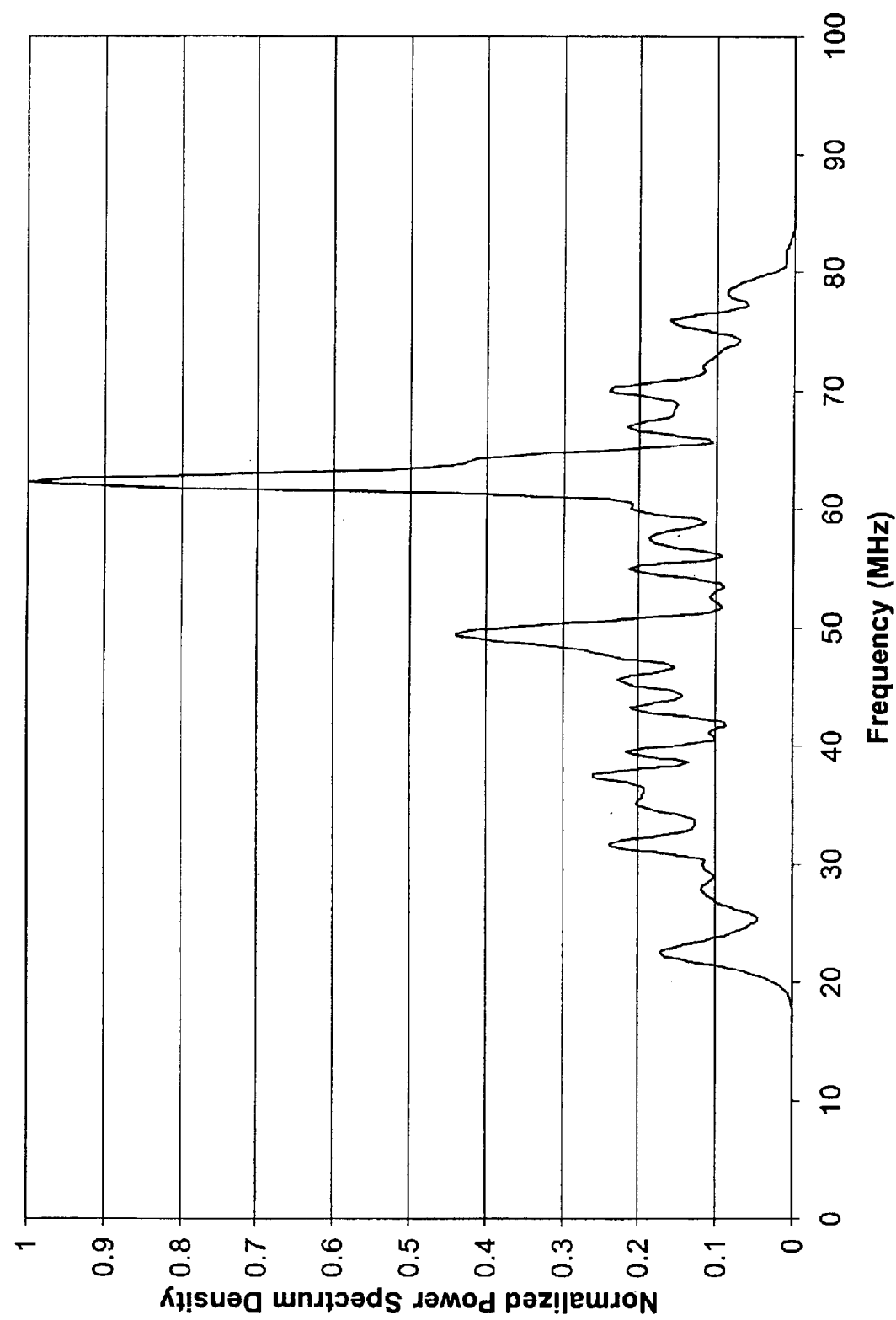
FIG. 7A is a representative plot of the windowed frequency response of a pressure vessel after receiving a discrete mechanical disturbance, plotting power spectrum density as a function of frequency, obtained from a transform of the voltage output of a piezo-electric sensor as a function of time, prior to the pressure vessel having received structural damage.

The output from such sensors was stored on the oscilloscope, and an average Power Spectrum Density (PSD), as a function of frequency, was obtained using the averages from the output for each sensor, and using a frequency scan (scale) from 17 to 85 MHZ, and a power factor scale to 1. Such data was then sent to the personal computer and stored. A representative sample of the output obtained from the sensors 22 and stored on the computer hard drive 26 is attached as FIG. 7A hereto.

Figure 6B:
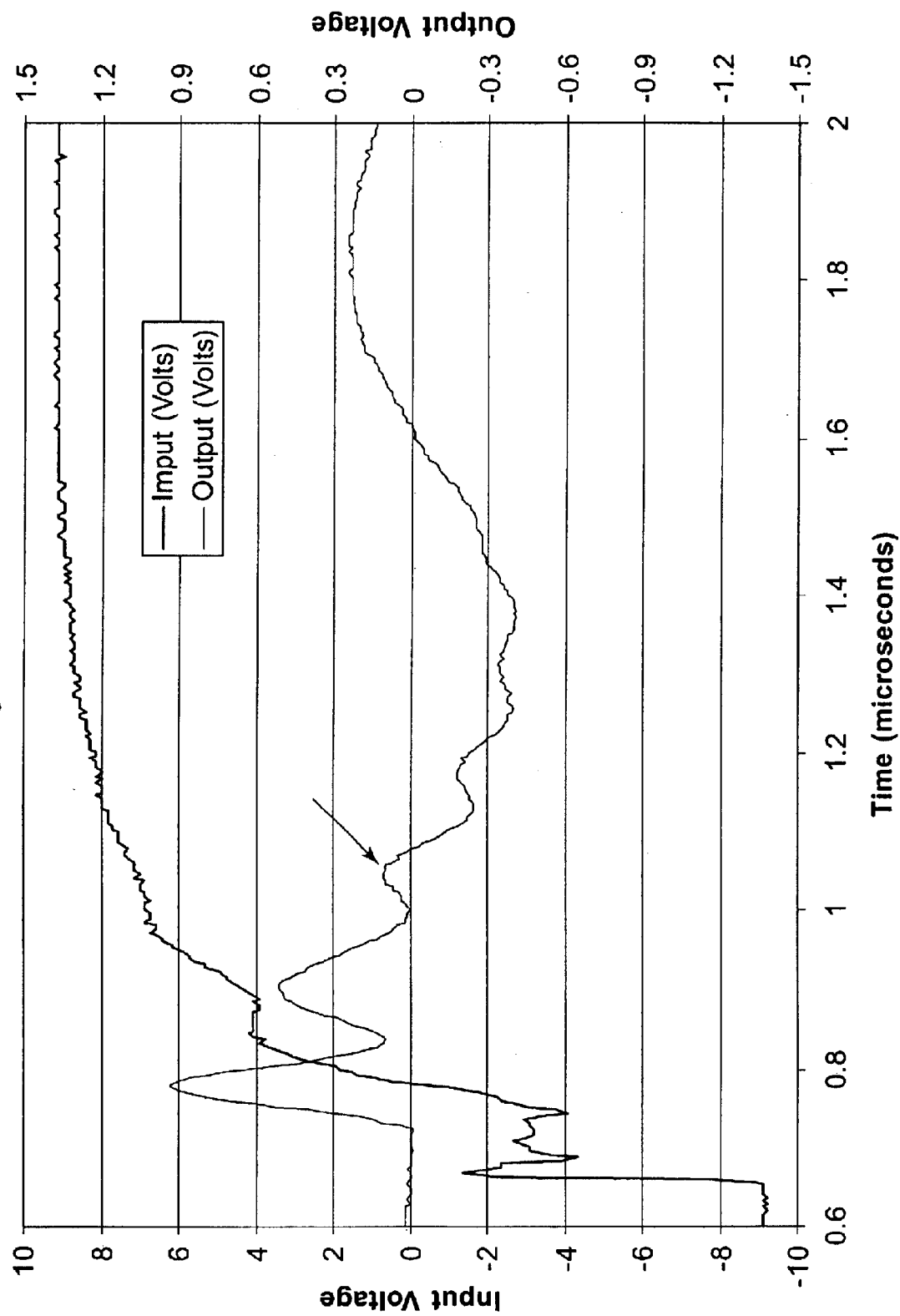
FIG. 6B is a similar representative frequency response of said same pressure vessel which received a further discrete mechanical disturbance at time=$\Delta$, after said same pressure vessel had received structural damage, plotting the voltage output from a piezo-electric sensor as a function of time.
Figure 7B:
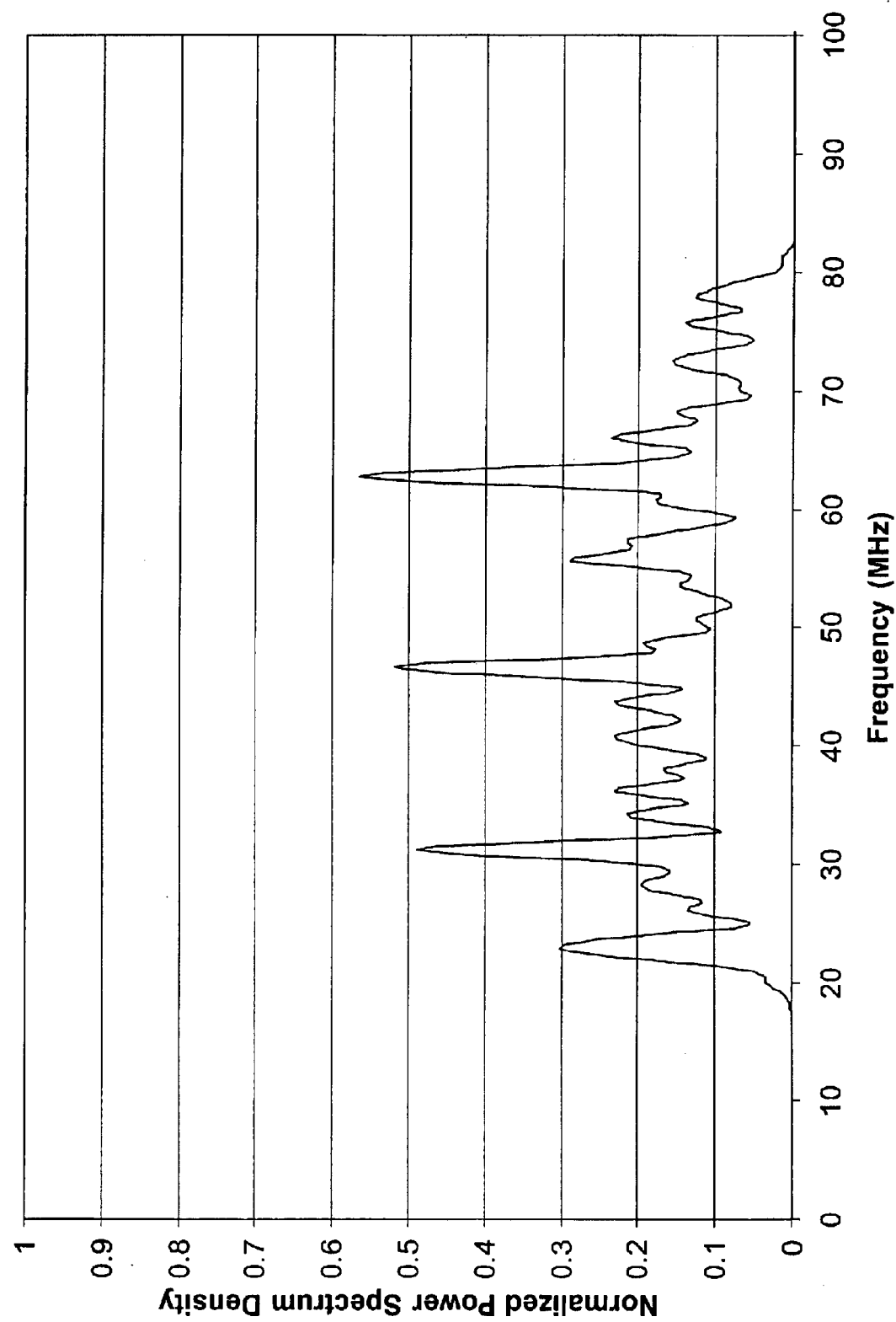
FIG. 7B is a representative plot of the windowed frequency response of a pressure vessel after receiving a discrete mechanical disturbance, plotting power spectrum density as a function of frequency, obtained from a transform of the voltage output of a piezo-electric sensor as a function of time, subsequent to the pressure vessel having received structural damage.

Thereafter, two longitudinal cuts, one 400 mm in length× 0.75 mm in depth, and another 25 mm in length×1.75 mm in depth were made in the pressure vessel 12 proximate one end. The above process was repeated, and representative samples of the output obtained respectively is attached as FIGS. 6B and 7B respectively.

Figure 6A:
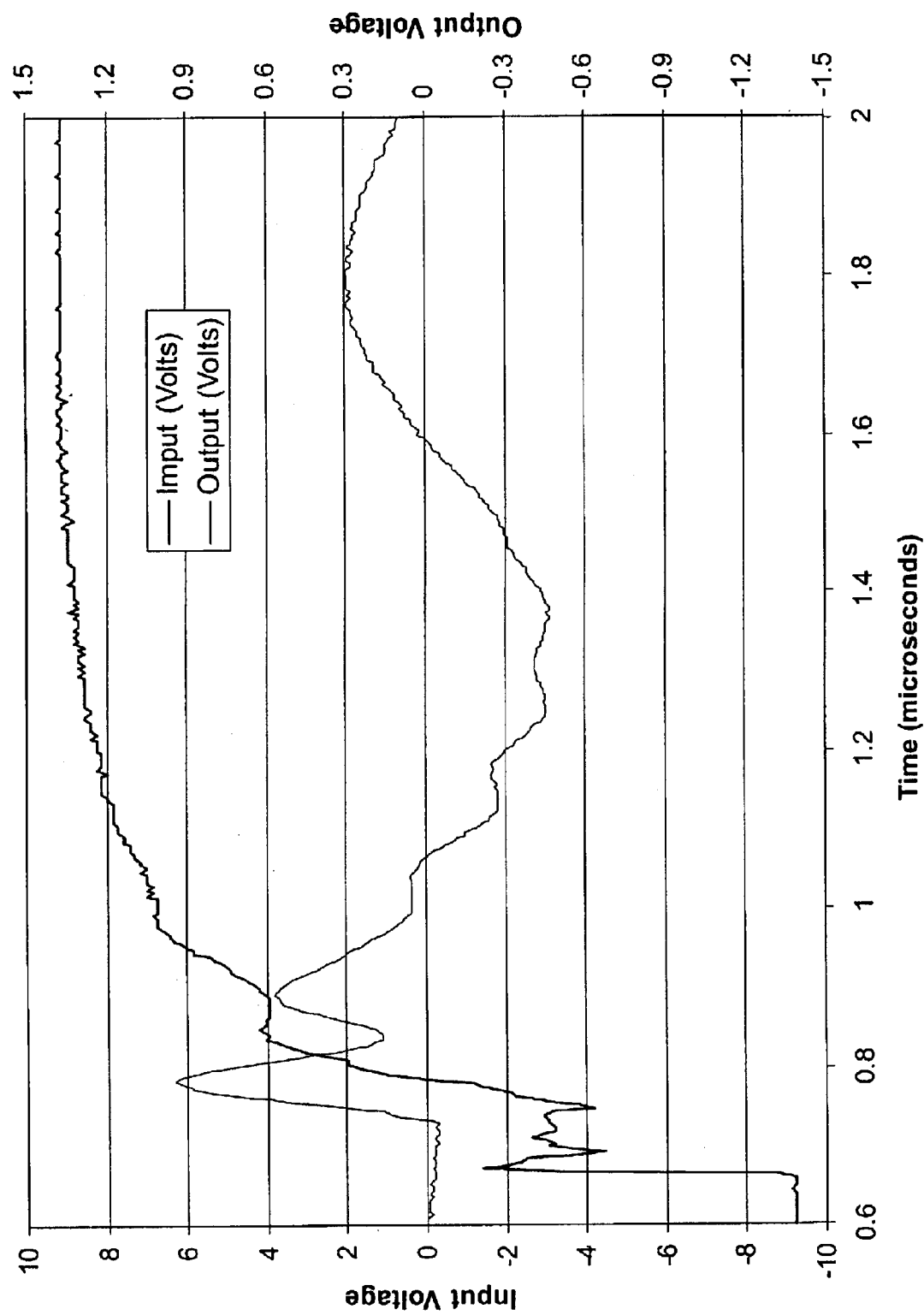
FIG. 6A is a representative plot of a frequency response of a pressure vessel after receiving a discrete mechanical disturbance, plotting the voltage output from a piezo-electric sensor as a function of time, prior to structural damage being inflicted on said pressure vessel.

Comparison between the graphical outputs 6A & 6B, and 7A & 7B indicates differences therebetween in the natural frequency responses when the pressure vessel was in a non-structurally compromised state, and thereafter when the above-mentioned gouges had been inflicted on the exterior load bearing shell 16 thereof. For example, the natural frequency response shown in FIG. 6B (damaged condition) at the location shown by the arrow, depicts an additional frequency response not present in the undamaged condition (FIG. 6A). While this comparison is done visually, numerous ways, as are commonly known in the art, exist for digitizing the signals shown in FIGS. 6A & 6B, and 7A & 7B, and using software to compare each of the two digitized outputs to determine if there is variation.

Although the disclosure describes and illustrates preferred embodiments of the invention, it is understood that the invention is not limited to these particular embodiments. Many variations and modifications will now occur to persons skilled in the art. For a complete definition of the invention made, reference is to be had to the appended claims.

We claim:

1. A method for determining if there may be deterioration in structural integrity of a pressure vessel having an exterior surface comprised of a composite material having both sensor means and oscillator means affixed to or embedded in said exterior surface, comprising:
   (a) providing an electrical current to said oscillator means so as to cause said oscillator means to oscillate so as to produce a mechanical disturbance to said exterior surface and cause a detectable natural frequency response of said pressure vessel;
   (b) detecting, using said sensor means, said natural frequency response;
   (c) recording said natural frequency response;
   (d) after a period of elapsed time, repeating steps a) and b); and
   (e) comparing said recorded natural frequency response first obtained with said natural frequency response last obtained, and determining if there be a difference therebetween.

2. The method as claimed in claim 1, wherein said mechanical disturbance in step a) occurs when said pressure vessel is subject to no internal pressure or a selected internal pressure, and said steps a) and b) are repeated as per step d) when said pressure vessel is subjected to said same no pressure or said selected pressure.

3. The method as claimed in claim 1, wherein said mechanical disturbance in step a) occurs when said pressure vessel is subject to a particular temperature, and said steps a) and b) are repeated as per step d) when said pressure vessel is subjected to said same particular temperature.

4. The method as claimed in claim 1, wherein said mechanical disturbance in step a) occurs when said pressure vessel is subject to a particular pressure and/or temperature, and steps a) and b) are repeated as per step d) when said pressure vessel is subjected to a different pressure and/or temperature, and prior to step e), applying a correction to said natural frequency response last obtained to correct for said different pressure and/or temperature so as to be able to compare said frequency response first obtained with said frequency response last obtained.

5. The method as claimed in claim 1 wherein said sensor means comprises piezo-electric sensor means.

6. The method as claimed in claim 5, wherein said steps of detecting using sensor means and providing an electrical impulse to said oscillator means comprises utilizing a single piezo-electric material, whereby said piezo-electric material is provided with said electrical impulse and also subsequently thereafter detects said resultant natural frequency response.

7. The method as claimed in claim 5, wherein said step of comparing said natural frequency response first obtained with said natural frequency response last obtained comprises obtaining a voltage response from said piezo-electric sensor means as a function of time and comparing said voltage response with a later obtained voltage response as a function of time, and determining if there be any differences.

8. The method as claimed in claim 5 wherein said step of comparing said resultant natural frequency response first obtained with said natural frequency response last obtained comprises:
   i) calculating a power spectrum density as a function of frequency from said resultant natural frequency response of said piezo-electric sensor means first obtained, and
   ii) calculating a power spectrum density as a function of frequency from said natural frequency response of said piezo-electric sensor means last obtained; and
   iii) comparing said power spectrum density obtained from step ii) above with that obtained from step i) above, and determining if there are differences.

9. The method as claimed in claim 1, and said oscillator means comprises piezo-electric oscillator means.

10. The method as claimed in claim 1, wherein said step of detecting using sensor means and providing an electrical impulse to said oscillator means comprises utilizing at least two individual piezo-electric materials, one of which is provided with said electrical impulse and the other or others detect said resultant natural frequency response.

11. The method as claimed in claim 1, wherein the step of determining if there be any differences comprises comparing the first obtained natural frequency response and the later-obtained natural frequency response, and determining if there has been a shift in the frequencies at which the natural resonances occur.

12. The method as claimed in claim 1, wherein the step of determining if there be any differences comprises comparing the first obtained natural frequency response and the later-obtained natural frequency response, and determining if there has been a a decrease or increase in the amplitude of one or more of the natural frequency resonances.

13. A structural integrity testing apparatus for a composite-reinforced pressure vessel having an exterior surface comprised of a composite material, comprising:
   (i) sensor means and oscillator means affixed to or embedded in said exterior surface;
   (ii) means for applying an electrical current to said oscillator means so as to cause said oscillator means to oscillate so as to produce a mechanical disturbance to said exterior surface and cause a detectable natural frequency response of said pressure vessel;
   (iii) means for recording said natural frequency response of said pressure vessel; and
   (iv) means for comparing said recorded resultant natural frequency response with a later-obtained natural frequency response, and determining if there be any difference therebetween.

14. The structural integrity testing apparatus as claimed in claim 13, further comprising:

means for indicating lack of pressure vessel integrity to an operator if said means for comparing indicates differences were detected.

15. The structural integrity testing apparatus as claimed in claim 14, further comprising:

means for applying a correction to said later-obtained natural frequency response to adjust for any differences in temperature and/or pressure to which said pressure vessel may be then subject as compared to temperature and/or pressures which it was subject at the time of first recording said resultant natural frequency response.

16. The structural integrity testing apparatus as claimed in claim 14, wherein said sensor means comprises piezo-electric sensor means.

17. The structural integrity testing apparatus as claimed in claim 14, wherein said oscillator means comprises piezo-electric oscillator means.

18. The structural integrity testing apparatus as claimed in claim 13, wherein said sensor means and said oscillator means each comprise piezo-electric materials.

19. The structural integrity testing apparatus as claimed in claim 13, wherein said sensor means and said oscillator means each comprise a single piezo-electric material, and said single piezo-electric material is first provided with said electrical impulse and subsequently thereafter detects said resultant natural frequency response.

20. The structural integrity testing apparatus as claimed in claim 13, wherein said means for recording said natural frequency response comprises means for detecting a voltage response from said sensor means and recording said voltage response from said sensor means as a function of time.

21. The structural integrity testing apparatus as claimed in claim 13, wherein said means for recording said natural frequency response comprises means for calculating a power spectrum density from an output signal received from said sensor means as a function of frequency.

22. A pressure vessel, comprising:

an inner vessel;

a reinforced material surrounding said inner vessel and forming an exterior surface;

both sensor means and oscillator means affixed to or embedded in said exterior surface; and, means for storing a resultant natural frequency response as received from said sensor means, after a mechanical disturbance has been provided to said exterior surface of said pressure vessel by said oscillator means.

23. The pressure vessel as claimed in claim 22, wherein said oscillator means comprises piezo-electric material which receives an electrical impulse so as be caused to oscillate and produce said mechanical disturbance.

24. The pressure vessel as claimed in claim 22, wherein said sensor means is a piezo-electric material which senses said mechanical disturbance.

25. The pressure vessel as claimed in claim 22, wherein said sensor means and said oscillation means each comprise piezo-electric materials.

26. The pressure vessel as claimed in claim 22, wherein said sensor means and oscillation means comprise a single piezo-electric material, and said piezo-electric material is provided with said electrical impulse and subsequently thereafter also detects said resultant natural frequency response.

* * * * *